United States Patent
Dutton et al.

(10) Patent No.: US 6,357,024 B1
(45) Date of Patent: *Mar. 12, 2002

(54) ELECTRONIC SYSTEM AND METHOD FOR IMPLEMENTING FUNCTIONAL REDUNDANCY CHECKING BY COMPARING SIGNATURES HAVING RELATIVELY SMALL NUMBERS OF SIGNALS

(75) Inventors: Drew J. Dutton; Dan S. Mudgett; Scott A. White, all of Austin, TX (US)

(73) Assignee: Advanced Micro Devices, Inc., Sunnyvale, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/132,334

(22) Filed: Aug. 12, 1998

(51) Int. Cl.[7] .................................................. G06F 11/00
(52) U.S. Cl. ....................................................... 714/45
(58) Field of Search .............................. 714/45, 6, 7, 8, 714/10, 11, 12, 13, 25, 31, 44, 37, 43; 710/7, 20

(56) References Cited

U.S. PATENT DOCUMENTS

| | | | | |
|---|---|---|---|---|
| 5,144,230 A | * | 9/1992 | Katoozi et al. | 324/158 R |
| 5,515,383 A | * | 5/1996 | Katoozi | 371/22.4 |
| 5,732,209 A | * | 3/1998 | Vigil et al. | 395/183.06 |
| 5,799,022 A | * | 8/1998 | Williams | 371/36 |
| 5,802,266 A | * | 9/1998 | Kanekawa et al. | 395/182.09 |
| 5,974,529 A | * | 10/1999 | Zumkehr et al. | 712/41 |
| 5,993,055 A | * | 11/1999 | Williams | 371/22.4 |
| 6,092,217 A | * | 7/2000 | Kanekawa et al. | 714/11 |

* cited by examiner

*Primary Examiner*—Nadeem Iqbal
(74) *Attorney, Agent, or Firm*—Kevin L. Daffer; Conley, Rose & Tayon P.C.

(57) ABSTRACT

An electronic system and method are presented for the implementation of functional redundancy checking (FRC) by comparing "signatures" produced by two different electronic devices, for example central processing units (CPUs). The signatures include a relatively small number of signals which reflect an internal state of each CPU. The electronic system includes a first and second CPU. Each CPU is configured to execute instructions and produce output signals. The first and second CPUs are preferably identical and execute instructions simultaneously such that their internal states and produced output signals should be the same at any given time. Each CPU includes a signature generator for generating the signature. The electronic system also includes a compare unit coupled to receive the signatures. The compare unit compares the signatures and produces an error signal if the signatures are not identical. The electronic system may be a computer system, further including a system bus and chip set logic. The system bus is adapted for coupling to one or more peripheral devices. The chip set logic is coupled between the first and second CPUs and the system bus, and functions as an interface between the first and second CPUs and the system bus. The first and second CPU are coupled to the chip set logic via separate processor buses. At least a portion of the signal lines of the separate processor buses are "point-to-point", enabling the processor buses to achieve relatively high data transfer rates.

10 Claims, 4 Drawing Sheets

ELECTRONIC SYSTEM AND METHOD FOR IMPLEMENTING FUNCTIONAL REDUNDANCY CHECKING BY COMPARING SIGNATURES HAVING RELATIVELY SMALL NUMBERS OF SIGNALS

BACKGROUND OF THE INVENTION

1. Field of the Invention

This invention relates to electronic computer systems, and more particularly to fault-tolerant or reliable electronic systems employing multiple processing units in order to reduce computational errors and/or determine the source of computational errors. The invention described herein may also be useful in supporting the development or investigation of improvements to components used in electronic systems employing multiple processing units.

2. Description of the Relevant Art

An electronic circuit such as a microprocessor may fail to produce a correct result due to "hard" failures or "soft" errors. Hard failures are permanent and reproducible, and typically result from design errors, fabrication errors, fabrication defects, and/or physical failures. A failure to properly implement a functional specification represents a design error. Fabrication errors are attributable to human error, and include the use of incorrect components, the incorrect installation of components, and incorrect wiring. Examples of fabrication defects, which result from imperfect manufacturing processes, include conductor opens and shorts, mask alignment errors, and improper doping profiles. Physical failures occur due to wear-out and/or environmental factors. The thinning and/or breakage of fine aluminum lead wires inside integrated circuit packages due to electromigration or corrosion are examples of physical failures. Soft errors, on the other hand, are temporary and non-reproducible. Soft errors are often the result of transient phenomenon such as electrical noise (e.g., power supply "glitches" and ground "bounce"), energetic particles (e.g., alpha particles), or "marginal" circuit design.

Incorrect results cannot be tolerated in computer systems used in, for example, aircraft flight control systems, missile guidance systems, and banking transactions. Computer systems used in such critical applications must be highly reliable. One method used to increase the reliability of such computer systems is called functional redundancy checking (FRC). FRC typically employs two electronic microprocessor devices functioning as central processing units (CPUs). A first "master" microprocessor and a second "checker" microprocessor receive the same input signals and execute instructions simultaneously (i.e., in lock step). The checker microprocessor compares the output signals produced by the master microprocessor to its own internally-generated output signals. If any output signal produced by the master microprocessor does not match the respective output signal produced by the checker microprocessor, the checker microprocessor generates an error signal which initiates corrective action (i.e., "notification").

FIG. 1 is a block diagram of a typical electronic computer system 10 employing FRC. Electronic computer system 10 includes identical first and second CPUs 12a and 12b, a processor bus 14, chip set logic 16, a memory unit 18, a memory bus 20, a system bus 22, and a peripheral device 24. CPUs 12a and 12b are typically microprocessor integrated circuits formed upon a single monolithic semiconductor substrate. Processor bus 14 couples both CPU 12a and CPU 12b to each other and to chip set logic 16. Chip set logic 16 functions as interface between CPUs 12a–b and system bus 22, and between CPUs 12a–b and memory unit 18. System bus 22 is adapted for coupling to one or more peripheral devices. Peripheral device 24 is coupled to system bus 22. Peripheral device 24 may be, for example, a disk drive unit, a video display unit, or a printer. Memory unit 18 stores data, and typically includes semiconductor memory devices. Chip set logic 16 is coupled to memory unit 18 via memory bus 20, and may include a memory controller.

CPUs 12a and 12b include built-in functional redundancy checking circuitry. During system initialization, either CPU 12a or CPU 12b is configured to be the master, and the other CPU is configured to be the checker CPU. The master CPU drives its output terminals, while the checker CPU changes its output terminals to function as input terminals. The respective terminals (e.g., "pins") of CPUs 12a and 12b are coupled together. The checker CPU compares its internally-generated values to those produced by the master CPU and received at the respective terminals. If any output signal produced by the master CPU does not match the respective output signal produced by the checker CPU, the checker CPU produces an error signal. The error signal may serve as notification to external error recovery hardware (not shown). For example, the error signal may be routed to a third maintenance CPU (not shown) or an interrupt controller (not shown) which initiates an error recovery routine in response to the error signal. The error recovery routine may involve "backing up" the software program running at the time the error occurred to an established "checkpoint" at which instruction execution may be reinitiated.

The master CPU initiates data read and write operations. In response to a memory read request from the master CPU, chip set logic 16 obtains data from memory unit 18 via memory bus 20 and provides the data to both CPU 12a and CPU 12b via processor bus 14. During a memory write operation, chip set logic 16 receives the data from the master CPU and stores the data within memory unit 18 via memory bus 20. In response to a read request from an address within an address range assigned to peripheral device 24, chip set logic 16 obtains data from peripheral device 24 via system bus 22 and provides the data to both CPU 12a and CPU 12b via processor bus 14. During a write operation to an address within an address range assigned to peripheral device 24, chip set logic 16 receives the data from the master CPU and provides the data to peripheral device 24 via system bus 22.

Several problems occur when implementing electronic computer system 10. Most importantly, the signals driven upon the output terminals of a CPU often do not adequately reflect the current internal execution state of the CPU. For example, there may be a time delay of many system clock cycles before an activity within the CPU results in signals being driven upon the output terminals. In addition, CPUs 12a and 12b may include relatively large internal cache memory systems 26a and 26b. Such cache memory systems are capable of holding large numbers of instructions and data. CPUs 12a and 12b are capable of operating for extended periods using instructions and data stored in respective cache memory systems 26a and 26b. During these extended periods, any computational errors produced do not propagate to the terminals of CPUs 12a and 12b, and are hence not "visible" for detection using FRC. As a result, cache memory systems 26a and 26b tend to delay error detection. Early detection of an error is key to determining the cause of the error and reducing the likelihood that valuable data is lost due to the error.

Furthermore, the maximum amount of data which may be transferred over processor bus 14 in a given amount of time (i.e., the maximum "speed" of processor bus 14) is limited by the increased electrical loading of two CPUs and signal reflections within the signal lines of processor bus 14 due to the multiple connection points (i.e., terminations). Electronic computer system 10 does not support separate "point-to-point" processor buses capable of much higher speeds.

It would be beneficial to have an electronic system and method implementing FRC by comparing "signatures" generated by each CPU. Each "signature" would include a relatively small number of bits, and would preferably be representative of the internal execution state of the CPU. Immediate comparisons of representative signatures would facilitate earlier error detection, especially when the CPUs include relatively large internal cache memory systems. In addition, comparing only such signatures would reduce processor bus loading and signal reflections caused by multiple signal line terminations, allowing the processor buses to transfer more data in a given amount of time (i.e., to be "faster").

SUMMARY OF THE INVENTION

The problems outlined above are in large part solved by an electronic system and method implementing functional redundancy checking (FRC) by comparing "signatures" produced by each of two electronic devices, for example central processing units (CPUs). The signatures include a relatively small number of signals which are representative of the internal state (i.e., execution state) of each CPU. The electronic system includes a first CPU and second CPU. Each CPU is configured to execute instructions and to produce output signals. The first and second CPUs are preferably identical and execute instructions simultaneously such that their internal states and produced output signals are the same at any given time. Each CPU includes a signature generator for generating a signature representative of the internal state of the CPU. The electronic system also includes a compare unit coupled to receive the signatures produced by the first and second CPUs. The compare unit compares the signatures produced by the first and second CPUs and produces an error signal if the signatures are not identical. A compare unit may be integrated into each CPU, wherein only one of the compare units would be functional in a system employing multiple CPUs.

The electronic system may be, for example, a computer system, and may further include a system bus and chip set logic. The system bus may be adapted for coupling to one or more peripheral devices. The chip set logic may be coupled between the first and second CPUs and the system bus, and may function as an interface between the first and second CPUs and the system bus. The first CPU and the second CPU may be coupled to the chip set logic via separate processor buses. At least a portion of the signal lines of the separate processor buses may be "point-to-point", enabling the processor buses to achieve higher data transfer rates than the single processor bus of the typical computer system employing FRC in FIG. 1.

Each CPU may include a number of functional units, including a bus interface unit (BIU) which handles all data transfer operations for the CPU in accordance with established protocols. The BIU produces all CPU output signals coupled to the processor bus. In several embodiments, the signature generator is located within the BIU and generates a signature having a smaller number of signals than the number of output signals. Each signature signal may be, for example, dependent upon an internal state of a functional unit of the CPU.

For example, each CPU may include an integer and floating point functional units, and the signature generator of each CPU may generate a signature from current output signals produced by the integer and floating point units. In this case the signature produced by each CPU is highly representative of the internal state of the CPU, and the immediate comparisons of the signatures by the compare unit results in early error detection even when the CPUs include relatively large internal cache memory systems.

The present method of the detecting computational errors produced within an electronic computer system includes providing the first and second CPUs according to one of the embodiments described above along with the compare unit. The compare unit is coupled to receive the signatures produced by the first and second CPUs, and simultaneous instruction execution by the first CPU and the second CPU is initiated. Any difference in the signatures produced by the first and second CPUs represents a computational error and results in the generation of an FRC error signal by the compare unit.

BRIEF DESCRIPTION OF THE DRAWINGS

Other objects and advantages of the invention will become apparent upon reading the following detailed description and upon reference to the accompanying drawings in which.

Figure 1:
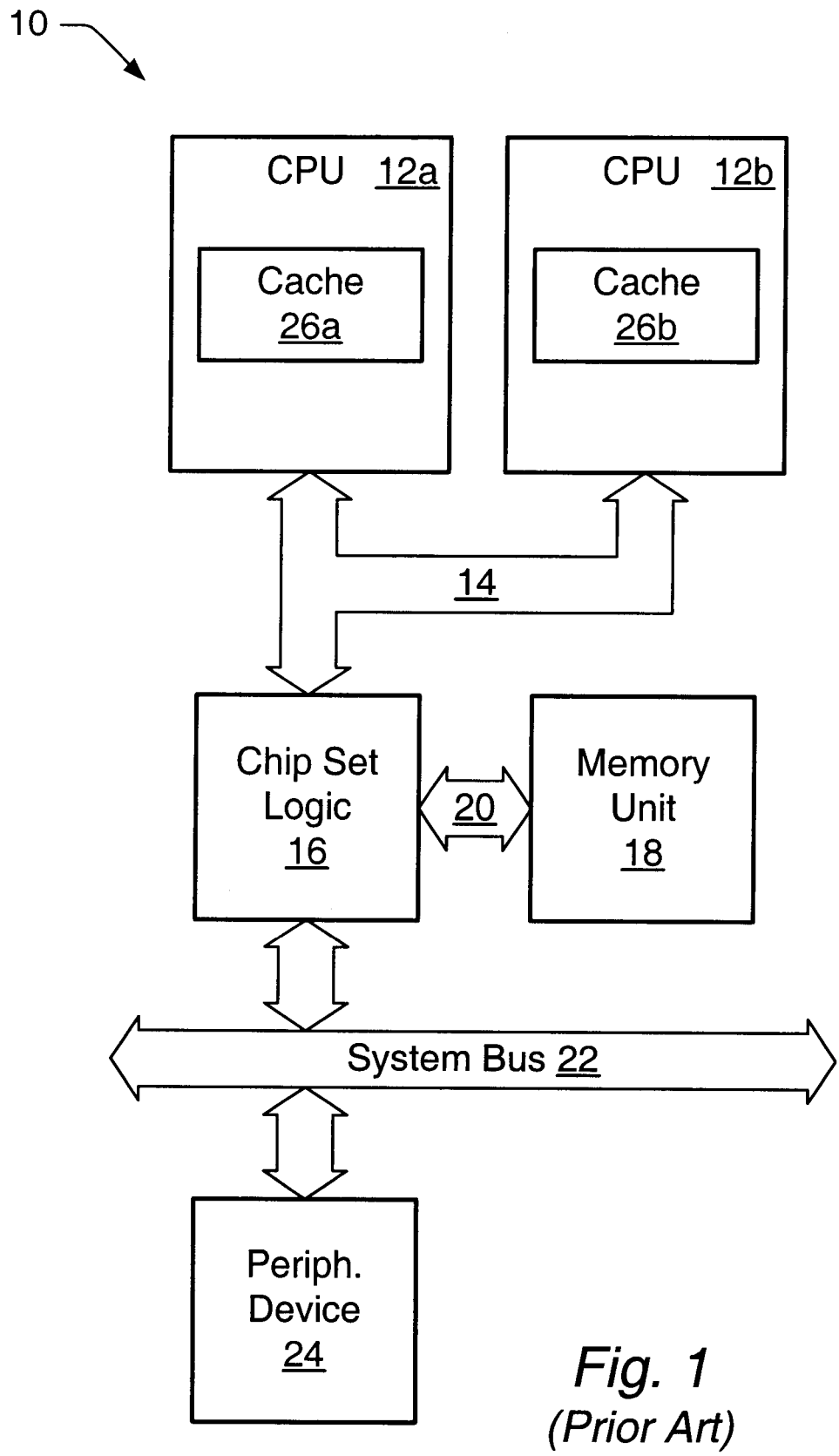
FIG. 1 is a block diagram of a typical electronic computer system employing functional redundancy checking, wherein a checker CPU compares its internally-generated output signals to those produced by a master CPU, and wherein the master and checker CPUs are coupled to each other and to chip set logic by a single processor bus.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Figure 2:
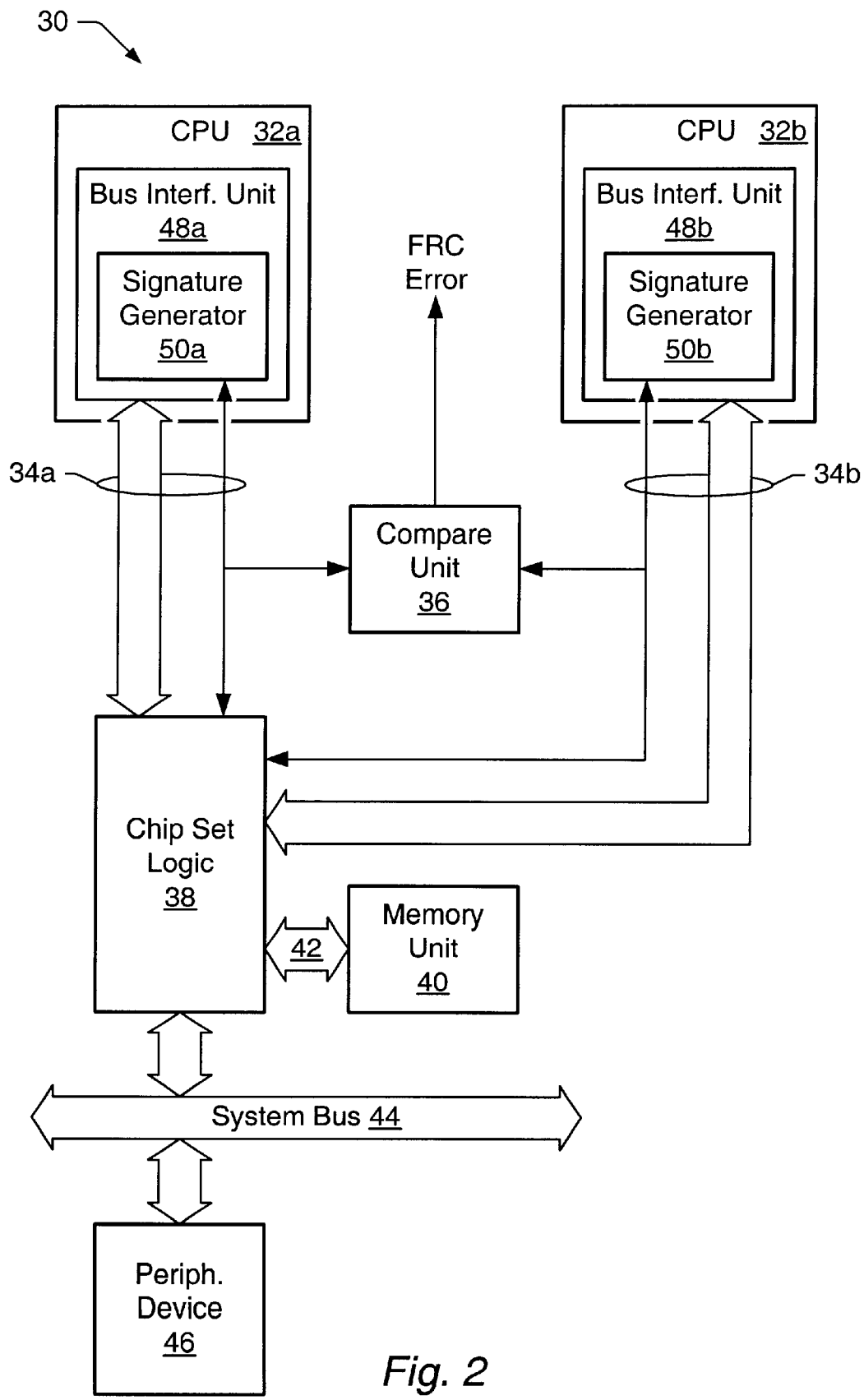
FIG. 2 is a block diagram of a first embodiment an electronic computer system in accordance with the present invention, wherein separate processor buses couple two CPUs to chip set logic, and wherein a signature generator within each CPU generates a signature from a portion of output signals produced by the CPU, and wherein each signature may comprise error control signals generated according to an error detection or correction technique, and wherein each processor bus includes signal lines conveying the signatures, and wherein a compare unit implements functional redundancy checking by comparing the signatures produced by the two CPUs.

FIG. 2 is a block diagram of a first embodiment an electronic computer system 30 in accordance with the present invention. Electronic computer system 30 includes a first CPU 32a, a second CPU 32b, a first processor bus 34a, a second processor bus 34b, a compare unit 36, chip set logic 38, a memory unit 40, a memory bus 42, a system bus 44, and a peripheral device 46. CPUs 32a and 32b are preferably identical microprocessor integrated circuits formed upon a single monolithic semiconductor substrate. First processor bus 34a couples first CPU 32a to chip set logic 38, and second processor bus 34b couples second CPU 32b to chip set logic 38. During operation of electronic computer system 30, CPUs 32a–b execute instructions simultaneously. Compare unit 36 receives "signatures" described below from both first CPU 32a and second CPU 32b, and generates an FRC error signal if the signatures are not identical. Chip set logic 38 is coupled to system bus 44 and functions as interface between CPUs 32a–b and system bus 44. Chip set logic 38 is also coupled between CPUs 32a–b and memory unit 40. Memory unit 40 stores data, and preferably includes semiconductor memory devices. Chip set logic 38 is coupled to memory unit 40 via memory bus 42, and may include a memory controller. System bus 44 is adapted for coupling to one or more peripheral devices. Peripheral device 46 is coupled to system bus 44. Peripheral device 46 may be, for example, a disk drive unit, a video display unit, or a printer.

CPU 32a includes a bus interface units (BIU) 48a, and CPU 32b includes a BIU 48b. Each BIU 48 handles all data transfer operations for the respective CPU 32 in accordance with established protocols. Each BIU 48 receives input signals from input terminals of the respective CPU 32, and drives output signals upon output terminals of the respective CPU 32. Such input and output signals generally include address signals, data signals, and control signals. Each BIU 48 may include, for example, data buffers and driver circuits which allow the respective CPU 32 to read data from or write data to external devices.

BIU 48a includes a signature generator 50a, and BIU 48b includes a signature generator 50b. Each signature generator 50 generates a "signature" which reflects the internal state (i.e., execution state) of CPU 32. The signature includes multiple bits (i.e., signals), wherein the number of signature signals is less than the number of output signals driven upon terminals of CPU 32. In other words, the signature signals are a subset of the output signals driven upon terminals of CPU 32.

Each bit in a signature may be dependent upon the internal state of a different functional unit of CPU 32. Candidate functional units include, for example, control units, floating point units, integer units, segmentation units, paging units, reorder buffer controllers, instruction caches, data caches, instruction prefetch units, instruction decode units, etc.

One implementation may include, for example, a four-bit signature. A first signature bit may be dependent upon the internal state of a data cache, a second bit may be dependent upon the internal state of an instruction cache, a third bit may be dependent upon the internal state of a reorder buffer controller, and the fourth bit may be dependent upon the internal state of a floating point unit. Each signature bit may be a logical combination (e.g., exclusive OR) of signals generated within the corresponding functional unit.

Alternately, the signature bits may be generated from one or more portions of the output signals according to an error detection technique. Parity checking is a well known error detection technique. For example, assume each BIU 48 generates 64 data output signals, and each corresponding signature generator 50 generates a signature from only the 64 data output signals. This may be accomplished, for example, by dividing the 64 data output signals into 8 groups of 8 signals, and generating one parity signal for each of the 8 groups. In this case the signature generated by each signature generator 50 is the 8 parity signals generated from the associated 64 data signals produced by the corresponding BIU 48.

The signature bits may also be one or more bits generated from one or more portions of the output signals according to an error correction technique. The Hamming codes is a well known family of error correction techniques. For example, assume again that each BIU 48 generates 64 data output signals, and each corresponding signature generator 50 generates a signature from only the 64 data output signals using a Hamming code technique. According to Hamming code theory, single-bit error correction within the 64-bit data word requires the addition of 7 error control bits to the 64-bit data word. In this case the signature generated by each signature generator 50 is the 7 error control signals generated from the 64 data signals produced by the corresponding BIU 48.

During operation of electronic computer system 30, both first CPU 32a and second CPU 32b drive output signals upon their output terminals. If the signature produced by CPU 32a does not match the signature produced by CPU 32b, compare unit 36 produces the FRC error signal. The FRC error signal may, for example, be routed to a third maintenance CPU (not shown) or an interrupt controller (not shown) which initiates an error recovery routine. The error recovery routine may involve "backing up" the software program running at the time the error occurred to an established "checkpoint" at which instruction execution may be reinitiated.

Chip set logic 38 responds to data transfer requests from CPUs 32a–b. Either CPU 32a or 32b may be selected to be a "master" CPU, the other CPU becoming a "checker" CPU. Chip set logic 38 obtains data from memory unit 40 via memory bus 42 and provides the data to CPU 32a and CPU 32b simultaneously via respective processor buses 34a and 34b. During a memory write operation, chip set logic 38 receives data from the master CPU via the respective processor bus 34a or 34b and stores the data within memory unit 40 via memory bus 42. Chip set logic 38 ignores write cycles generated by the checker CPU. In response to a read request from an address within an address range assigned to peripheral device 46, chip set logic 38 obtains data from peripheral device 46 via system bus 44 and provides the data to CPU 32a and CPU 32b simultaneously via respective processor buses 34a and 34b. During a write operation to an address within an address range assigned to peripheral device 46, chip set logic 38 receives the data from the master CPU via respective processor bus 34a or 34b and provides the data to peripheral device 46 via system bus 44.

In the embodiment of FIG. 2, two separate processor buses 34a–b are used, and compare unit 36 receives only the signatures produced by signature generators 50a–b. Thus only a portion of the signal lines of processor buses 34a–b have multiple connection points (i.e., terminations) which contribute to increased electrical loadings and signal reflections. All other signal lines of processor buses 34a–b are point-to-point signal lines. It is believed the maximum amount of data which may be transferred over processor buses 34a–b in a given amount of time (i.e., the maximum "speeds" of processor buses 34a–b) exceed that of the typical single processor bus 14 shown in FIG. 1.

In the embodiment of FIG. 2, chip set logic 38 may also include error correction circuitry to take advantage of the error correction capability provided by the supplied signature (i.e., error control bits). Where the signatures are generated from the output data signals according to an error correction technique, chip set logic 38 may be able to correct single-bit errors occurring in one or both sets of data signals received from CPUs 32a–b. It is noted that compare unit 36 may be included within one or both CPUs 32a–b.

Figure 3:
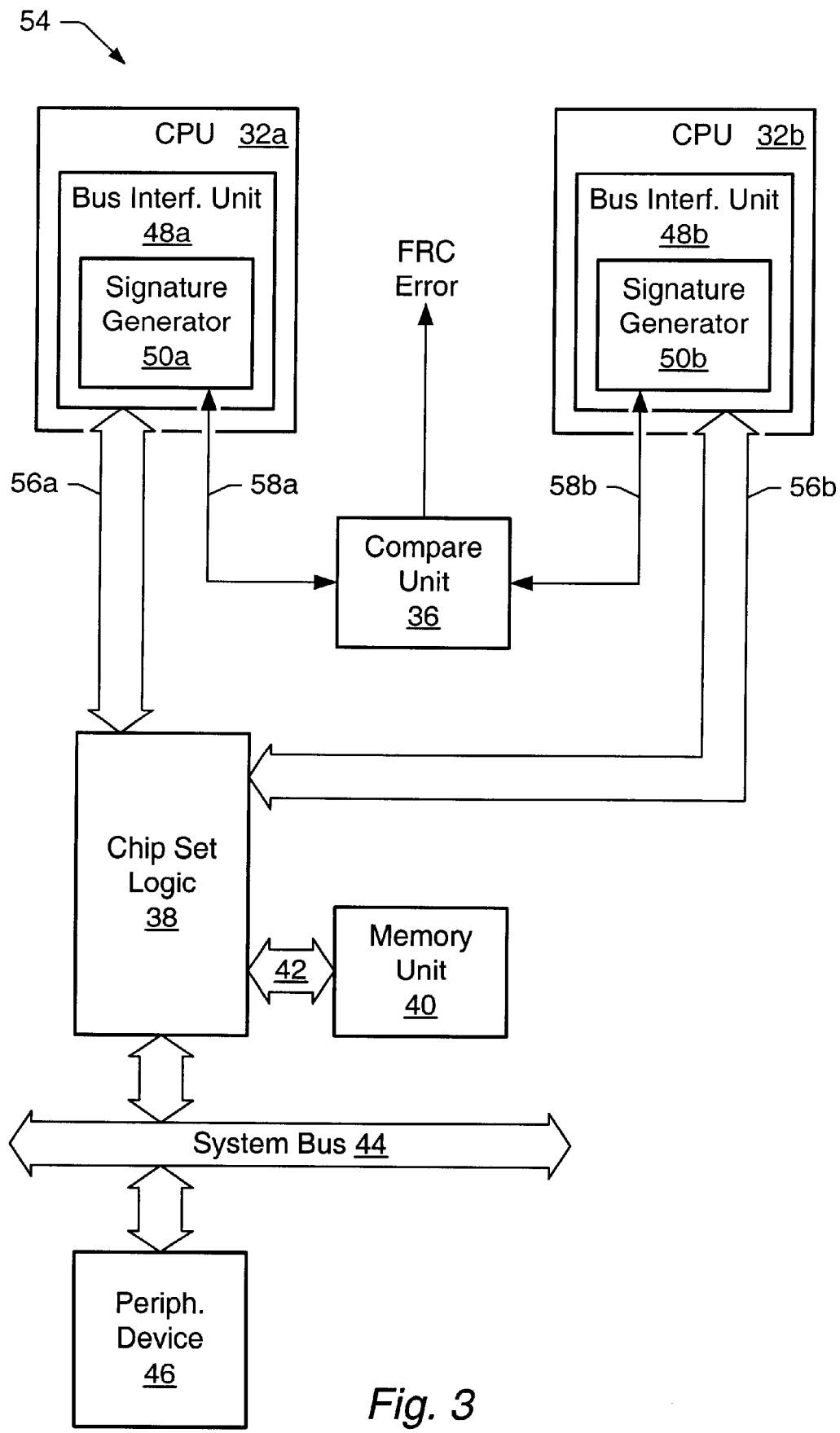
FIG. 3 is a block diagram of a second embodiment of an electronic computer system in accordance with the present invention, wherein separate processor buses couple two CPUs to chip set logic, and wherein a signature generator within each CPU generates a signature from a portion of output signals produced by the CPU, and wherein each signature may comprise error control signals generated according to an error detection or correction technique, and wherein separate signature buses convey the signatures to the compare unit, and wherein the compare unit implements functional redundancy checking by comparing the signatures produced by the two CPUs.

FIG. 3 is a block diagram of a second embodiment of an electronic computer system 54 in accordance with the present invention. Electronic computer system 54 includes first CPU 32a, second CPU 32b, compare unit 36, chip set logic 38, memory unit 40, memory bus 42, system bus 44, peripheral device 46, a first processor bus 56a, a second processor bus 56b, a first signature bus 58a, and a second signature bus 58b. First processor bus 56a couples first CPU 32a to chip set logic 38, and second processor bus 56b couples second CPU 32b to chip set logic 38. Signal lines of signature buses 58a–b convey signatures produced by respective signature generators 50a–b to compare unit 36.

Chip set logic 38 responds to data transfer requests from CPUs 32a–b. Chip set logic 38 obtains data from memory unit 40 via memory bus 42 and provides the data to both CPU 32a and CPU 32b via respective processor buses 56a and 56b. During a memory write operation, chip set logic 38 receives data from CPUs 32a–b via respective processor buses 56a and 56b and stores the data within memory unit 40 via memory bus 42. In response to a read request from an address within an address range assigned to peripheral device 46, chip set logic 38 obtains data from peripheral device 46 via system bus 44 and provides the data to both CPU 32a and CPU 32b via respective processor buses 56a and 56b. During a write operation to an address within an address range assigned to peripheral device 46, chip set logic 38 receives the data from the CPUs 32a–b via respective processor buses 56a and 56b and provides the data to peripheral device 46 via system bus 44.

In the embodiment of FIG. 3, none of the signal lines of processor buses 56a–b have multiple terminations which contribute to increased electrical loadings and signal reflections. In other words, all of the signal lines of processor buses 56a–b are point-to-point signal lines. It is believed the maximum amount of data which may be transferred over processor buses 56a–b in a given amount of time (i.e., the maximum "speeds" of processor buses 56a–b) exceed those of processor buses 34a–b of FIG. 2 and that of the typical single processor bus 14 shown in FIG. 1. It is noted, however, that in the embodiment of FIG. 3, chip set logic 38 does not receive the signatures and therefore cannot take advantage of any error correction capability provided by the signatures. It is also noted that compare unit 36 may be included within one or both CPUs 32a–b.

Figure 4:
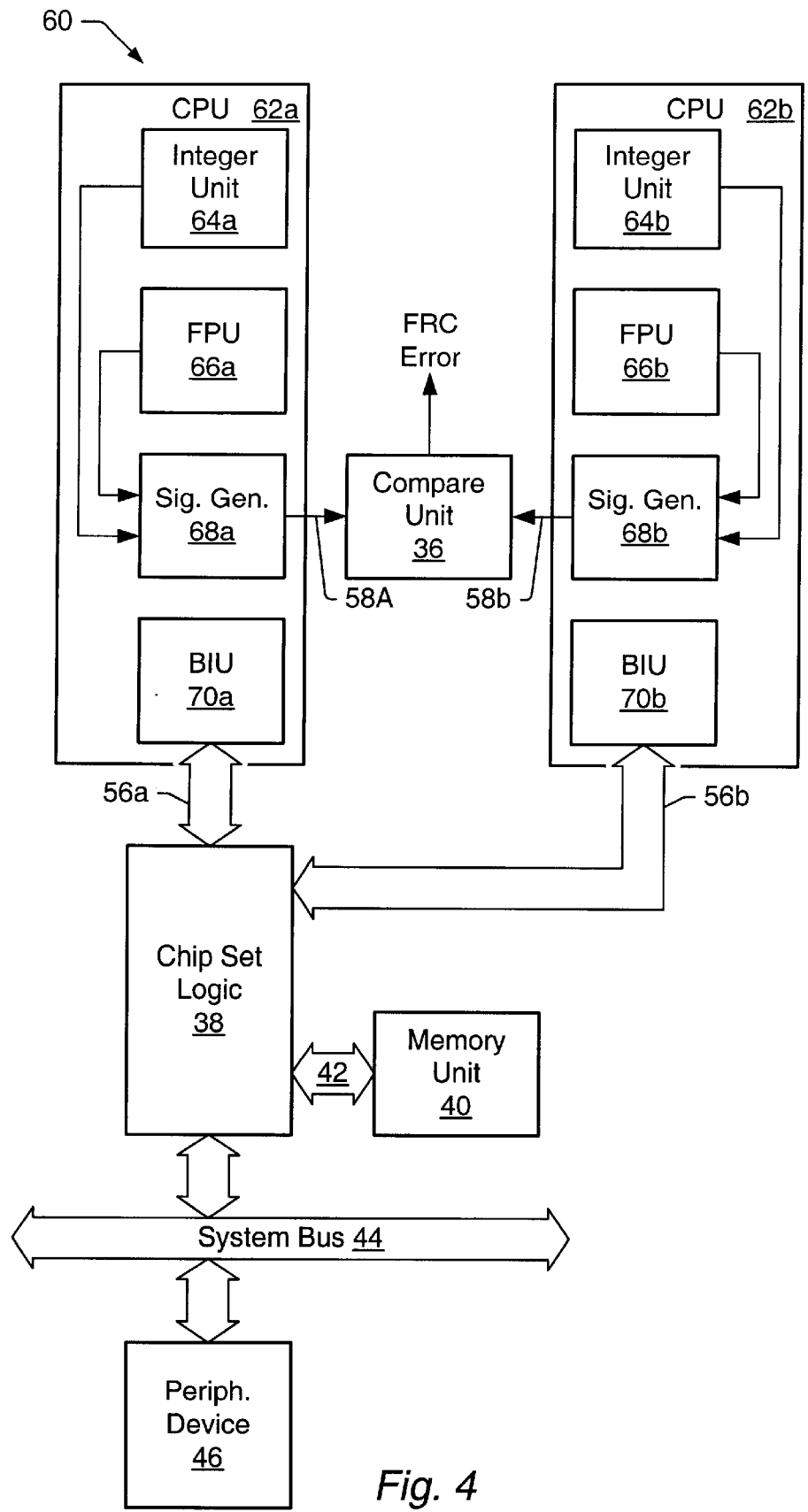
FIG. 4 is a block diagram of a third embodiment of an electronic computer system in accordance with the present invention, wherein separate processor buses couple two CPUs to chip set logic, and wherein each CPU includes multiple functional units, and wherein a signature generator within each CPU generates a signature by combining output signals produced by selected functional units, and wherein separate signature buses convey the signatures to the compare unit, and wherein the compare unit implements functional redundancy checking by comparing the signatures produced by the two CPUs.

FIG. 4 is a block diagram of a third embodiment of a electronic computer system 60 in accordance with the present invention. Electronic computer system 60 includes a first CPU 62a, a second CPU 62b, compare unit 36, chip set logic 38, memory unit 40, memory bus 42, system bus 44, peripheral device 46, first processor bus 56a, second processor bus 56b, first signature bus 58a, and second signature bus 58b. CPUs 62a and 62b are preferably identical microprocessor integrated circuits formed upon a single monolithic semiconductor substrate. During operation of electronic computer system 30, CPUs 62a–b execute instructions simultaneously.

CPU 62a includes several functional units, including an integer unit 64a, a floating point unit 66a, and a BIU 70a. As CPU 62b is preferably identical to CPU 62a, CPU 62b also includes comparable functional units, including an integer unit 64b, a floating point unit 66b, and a BIU 70b. Each integer unit 64 is configured to perform integer mathematical operations, including integer addition, subtraction, multiplication, and division. Each floating point unit 66 is configured to perform floating point mathematical operations, including floating point addition, subtraction, multiplication, and division.

In addition to the functional units, CPU 62a includes a signature generator 68a and CPU 62b includes a signature generator 68b. In the embodiment of FIG. 4, each signature generator 68 generates a signature dependent upon the output signals produced by the respective integer unit 64 and floating point unit 66. That is, each signature generator 68 combines the output signals produced by the respective integer unit 64 and floating point unit 66 to form a set of signature signals. The signature preferably includes a smaller number of signals than the combined number of output signals produced by the respective integer unit 64 and floating point unit 66. Each signature generator 68 may produce the signature by, for example, logically combining two or more control signals or output signals produced by the respective integer unit 64 and floating point unit 66. Each signature generator 68 may also produce the signature by, for example, applying an error detection or correction technique as described above to the control signals or output signals, and providing the error control bits produced in accordance with the error detection or correction technique as the signature.

Each BIU 70 handles all data transfer operations for the respective CPU 62 in accordance with established protocols. Each BIU 70 receives input signals from input terminals of the respective CPU 62, and drives output signals upon output terminals of the respective CPU 62. Such input and output signals generally include address signals, data signals, and control signals. Each BIU 70 may include, for example, data buffers and driver circuits which allow the respective CPU 62 to read data from or write data to external devices.

As in the embodiment of FIG. 3, first processor bus 56a couples first CPU 32a to chip set logic 38, and second processor bus 56b couples second CPU 32b to chip set logic 38. Signal lines of signature buses 58a–b convey signatures produced by respective signature generators 68a–b to compare unit 36. As in the embodiment of FIG. 3, none of the signal lines of processor buses 56a–b have multiple terminations which contribute to increased electrical loadings and signal reflections (i.e., all of the signal lines of processor buses 56a–b are point-to-point signal lines). Again, it is believed the maximum amount of data which may be transferred over processor buses 56a–b in a given amount of time (i.e., the maximum "speeds" of processor buses 56a–b) exceed those of processor buses 34a–b of FIG. 2 and that of the typical single processor bus 14 shown in FIG. 1. It is noted that as in the embodiment of FIG. 3, chip set logic 38 does not receive the signatures and therefore cannot take advantage of any error correction capability provided by the signatures.

In the embodiment of FIG. 4, the signatures produced by signature generators 68a–b represent the current values produced by selected functional units (i.e., respective integer units 64a–b and floating point units 66a–b). Such signatures are thus highly representative of the internal state of the respective CPU 62, and the immediate comparisons of such representative signatures facilitate early error detection even when CPUs 62 include relatively large internal cache memory systems. It is noted that compare unit 36 may be included within one or both CPUs 62a–b.

It is noted that the FRC technique described above allows more immediate detection and identification of different behavior between devices. This capability is extremely useful in finding design and manufacturing flaws which result in reduced yields and product quality, especially when flaws are intermittent or hard to detect in some other way.

It is also noted that the electronic system and method of the present invention may be used to determine which circuit (e.g., functional unit) within a CPU limits the maximum operating speed of the CPU. For example, one of two identical CPUs coupled to compare unit 36 may be cooled to a temperature below that of the other "uncooled" CPU. The cooled CPU is capable of operating correctly at a higher system clock frequency (i.e., a higher "speed") than the uncooled CPU. The frequency of the system clock signal supplied to both CPUs may be increased until the uncooled CPU fails to operate correctly (e.g., produces an error). The FRC technique described above may be used to determine which circuit (e.g., functional unit) failed, causing the error. The failed circuit may be modified to allow correct performance at the higher speed, thereby increasing the operational capability of the CPU.

Further, it is noted that a compare unit may be integrated into each CPU. When two or more CPUs are incorporated into a computer system, only one of the compare units within one of the CPUs may be made functional. It is also noted the CPUs may share a common processor bus.

It will be appreciated by those skilled in the art having the benefit of this disclosure that this invention is believed to be an electronic system and method implementing functional redundancy checking (FRC) by comparing "signatures" produced by two different central processing units (CPUs). The signatures include a relatively small number of signals which are representative of the internal state of each CPU. Furthermore, it is also to be understood that the form of the invention shown and described is to be taken as exemplary, presently preferred embodiments. Various modifications and changes may be made without departing from the spirit and scope of the invention as set forth in the claims. It is intended that the following claims be interpreted to embrace all such modifications and changes.

What is claimed is:

1. An electronic system, comprising:
    a first and second electronic devices each configured to produce a number of output signals, wherein each electronic device includes a signature generator for generating a signature, and wherein a given signature produced by a corresponding electronic device includes a smaller number of signals than the number of output signals and is indicative of a current internal state of the corresponding electronic device; and
    a compare unit coupled to receive the signatures produced by the first and second electronic devices, to compare the signatures, and to produce an error signal if the signatures are not identical.

2. The electronic system as recited in claim 1, wherein the first and second electronic devices are central processing units (CPUs) configured to execute instructions.

3. The electronic system as recited in claim 2, wherein the first and second CPUs are identical.

4. The electronic system as recited in claim 3, wherein the first and second CPUs execute instructions simultaneously.

5. The electronic system as recited in claim 2, wherein the first and second CPUs each comprise a bus interface unit (BIU) configured to produce the output signals, and wherein the signature generator within each CPU is located within the BIU.

6. The electronic system as recited in claim 2, wherein each CPU comprises a plurality of functional units, and wherein a given signature produced by a corresponding CPU is indicative of a current internal state of at least one of the functional units of the corresponding CPU.

7. The electronic system as recited in claim 2, further comprising:
    a system bus adapted for coupling to one or more peripheral devices;
    chip set logic coupled to the first CPU, the second CPU, and the system bus, wherein the chip set logic functions as an interface between the first and second CPUs and the system bus; and
    wherein the first and second CPUs are coupled to the chip set logic by separate processor buses.

8. A computer system, comprising:
    a first and second central processing unit (CPU) each configured to execute instructions, wherein each CPU comprises a bus interface unit (BIU) configured to produce output signals, and wherein each BIU includes a signature generator for generating a signature, and wherein a given signature includes a smaller number of signals than the number of output signals and is indicative of a current internal state of a corresponding one of the CPUs;
    a compare unit coupled to receive the signatures produced by the first CPU and the second CPU, to compare the signatures, and to produce an error signal if the signatures are not identical;
    a system bus adapted for coupling to one or more peripheral devices;
    chip set logic coupled to the first CPU, the second CPU, and the system bus, wherein the chip set logic functions as an interface between the first and second CPUs and the system bus; and
    wherein the first and second CPUs are coupled to the chip set logic by separate processor buses.

9. The computer system as recited in claim 8, wherein each CPU comprises a plurality of functional units, and wherein a given signature produced by a corresponding CPU is indicative of a current internal state of at least one of the functional units of the corresponding CPU.

10. A computer system, comprising:
    a first and second central processing unit (CPU) each configured to execute instructions, wherein each CPU comprises a plurality of functional units and a signature generator, and wherein the signature generator is configured to generate a signature, and wherein a given signature produced by a corresponding CPU is indicative of a current internal state of at least one of the functional units of the corresponding CPU;
    a compare unit coupled to receive the signatures produced by the first CPU and the second CPU, to compare the signatures, and to produce an error signal if the signatures are not identical;

a system bus adapted for coupling to one or more peripheral devices; and chip set logic coupled to the first CPU, the second CPU, and the system bus, wherein the chip set logic functions as an interface between the first and second CPUs and the system bus; and wherein the first and second CPUs are coupled to the chip set logic by separate processor buses.

* * * * *

UNITED STATES PATENT AND TRADEMARK OFFICE
CERTIFICATE OF CORRECTION

PATENT NO.    : 6,357,024 B1                                              Page 1 of 2
DATED         : March 12, 2002
INVENTOR(S)   : Dutton et al.

It is certified that error appears in the above-identified patent and that said Letters Patent is hereby corrected as shown below:

<u>Column 9, line 56 - Column 10, line 2,</u>
An electronic system, comprising:
a first and second electronic devices each configured to produce a plurality of output
       signals, wherein each electronic device includes a signature generator for
       generating a signature, and wherein a given signature produced by a
       corresponding electronic device is a parity coded representation of the
       respective plurality of output signals; and a compare unit coupled to receive the signatures produced by the first and second
       electronic devices, to compare the signatures, and to note an error in the
       operation of the first electronic device or second electronic device if the
       signatures are not identical.

<u>Column 10,</u>
Lines 14-18,
       The electronic system as recited in claim 2, wherein each CPU comprises a
plurality of functional units, and wherein each signature signal produced by each CPU
is dependent upon an internal state of a functional unit of the CPU.
Lines 29-51,
A computer system, comprising:
a first and second central processing unit (CPU) each configured to execute instructions,
       wherein each CPU comprises a bus interface unit (BIU) configured to produce
       output signals, and wherein each BIU includes a signature generator for
       generating a signature, and wherein a given signature consists of the output
       signals coded according to an error correction technique;
a compare unit coupled to receive the signatures produced by the first CPU and the
       second CPU, to compare the signatures, and to produce and error signal if the
       signatures are not identical;
a system bus adapted for coupling to one or more peripheral devices;
chip set logic coupled to the first CPU, the second CPU, and the systems bus, wherein
       the chip set logic functions as an interface between the first and second CPUs
       and the system bus; and
wherein the first and second CPUs are coupled to the chip set logic by separate
       processor buses.
Lines 52-56,
       The computer system as recited in claim 8, wherein each CPU comprises a
plurality of functional units, and wherein each signature signal produced by each CPU is
dependent upon an internal state of a functional unit of the CPU, and wherein the chip
set logic is coupled to receive the signature signals.

UNITED STATES PATENT AND TRADEMARK OFFICE
CERTIFICATE OF CORRECTION

PATENT NO. : 6,357,024 B1
DATED : March 12, 2002
INVENTOR(S) : Dutton et al.

It is certified that error appears in the above-identified patent and that said Letters Patent is hereby corrected as shown below:

<u>Column 10, line 57 - Column 12, line 4,</u>
A computer system, comprising:
a first and second central processing unit (CPU) each configured to execute instructions,
    wherein each CPU comprises a plurality of functional units and a signature
    generator, and wherein the signature generator is configured to generate a
    signaure, and wherein the signature is an error correction code of an output of
    each CPU exclusive of any outputs from the functional units;
a compare unit coupled to receive the signatures produced by the first CPU and the
    second CPU, to compare the signatures, and to note an error in the operation of
    the first CPU or the second CPU if the signatures are not identical;
a system bus adapted for coupling to one or more peripheral devices; and
chip set logic coupled to the first CPU, the second CPU, and the system bus, wherein
    the chip set logic functions as an interface between the first and second CPUs
    and the system bus; and
wherein the first and second CPUs are coupled to the chip set logic by separate
    processor buses.

Signed and Sealed this

Twenty-third Day of July, 2002

*Attest:*

*Attesting Officer*

JAMES E. ROGAN
*Director of the United States Patent and Trademark Office*